(12) United States Patent
Sorenson

(10) Patent No.: US 7,444,592 B1
(45) Date of Patent: *Oct. 28, 2008

(54) METHODS AND SYSTEMS INVOLVING OBJECT ATTRIBUTE RECOGNITION

(75) Inventor: Michael W Sorenson, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/965,437

(22) Filed: Dec. 27, 2007

(51) Int. Cl.
*G06F 17/00* (2006.01)
(52) U.S. Cl. .................. 715/269; 715/235; 715/250
(58) Field of Classification Search .................. 715/269, 715/235, 250
See application file for complete search history.

(56) References Cited

U.S. PATENT DOCUMENTS

| | | | | |
|---|---|---|---|---|
| 6,700,591 | B1 * | 3/2004 | Sharpe | 715/762 |
| 6,871,319 | B2 * | 3/2005 | Taboada et al. | 715/227 |
| 6,886,133 | B2 * | 4/2005 | Bailey et al. | 715/269 |
| 6,892,348 | B1 * | 5/2005 | Truelove et al. | 715/255 |
| 7,231,602 | B1 * | 6/2007 | Truelove et al. | 715/205 |
| 2002/0174143 | A1 * | 11/2002 | Taboada et al. | 707/509 |
| 2002/0188637 | A1 * | 12/2002 | Bailey et al. | 707/530 |
| 2005/0188307 | A1 * | 8/2005 | Bailey et al. | 715/531 |
| 2007/0061714 | A1 | 3/2007 | Stuple et al. | |
| 2007/0220424 | A1 | 9/2007 | Shaw et al. | |

* cited by examiner

*Primary Examiner*—Doug Hutton
*Assistant Examiner*—Henry Orr
(74) *Attorney, Agent, or Firm*—Cantor Colburn LLP; Daniel McLoughlin

(57) ABSTRACT

An exemplary method for displaying formatting of objects, the method comprising, receiving an input, wherein the input is a selected range of objects, determining formatting attributes of the selected range of objects, determining an amount of objects having each of the formatting attributes in the selected range of objects, displaying each of the determined formatting attributes, designating each of the determined formatting attributes displayed with a unique non-textual indicator, marking the objects in the selected range of objects with the unique non-textual indicator corresponding to the determined formatting attributes of the objects in the selected range of objects, and marking the objects in the selected range of objects with a second type of indicator to indicate the determined amount of objects having each of the formatting attributes in the selected range of objects relative to a total amount of objects in the selected range of objects.

4 Claims, 4 Drawing Sheets

METHODS AND SYSTEMS INVOLVING OBJECT ATTRIBUTE RECOGNITION

CROSS REFERENCE RO RELATED APPLICATIONS

The present application is co-pending with the concurrently filed application, entitled "METHODS INVOLVING TEXT ATTRIBUTE RECOGNITION," assigned to the assignee of the present application, the contents of which are incorporated herein by reference in their entirety.

BACKGROUND OF THE INVENTION

1. Field of the Invention

This invention relates generally to formatting objects and specifically to displaying attributes of objects.

2. Description of Background

Items displayed in a graphical user interface (GUI) such as text and other types of graphical objects displayed in computer systems may include a number of different attributes and properties such as different fonts and font sizes or pixel padding properties. The text may also be formatted to be, for example, bolded or underlined. Often, when a user selects a group of objects, there is an indication on a GUI that shows the attributes and properties of the selected objects. If the selected objects include a number of different attributes such as two different types of fonts, the indication on the GUI for the font of the selected objects is blank. This results in a user having limited feedback regarding the attributes and properties of the selected objects. Thus, it is desirable to use a method and system that allows a user to select graphical objects and quickly determine how they are formatted.

SUMMARY OF THE INVENTION

The shortcomings of the prior art are overcome and additional advantages are achieved through an exemplary method for displaying formatting of objects, the method comprising, receiving an input, wherein the input is a selected range of objects, determining formatting attributes of the selected range of objects, determining an amount of objects having each of the formatting attributes in the selected range of objects, displaying each of the determined formatting attributes, designating each of the determined formatting attributes displayed with a unique non-textual indicator, marking the objects in the selected range of objects with the unique non-textual indicator corresponding to the determined formatting attributes of the objects in the selected range of objects, and marking the objects in the selected range of objects with a second type of indicator to indicate the determined amount of objects having each of the formatting attributes in the selected range of objects relative to a total amount of objects in the selected range of objects.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Systems and methods involving displaying attributes of graphical objects are provided. Several exemplary embodiments are described.

Visual programming software may include a number of objects on a display in a graphical user interface (GUI). One example of visual programming software includes, Cascading Style Sheets, level 2 (CSS2). CSS2 is a style sheet language that allows users to attach styles, properties, and formatting attributes (e.g., fonts, spacing, and aural cues) to structured documents (e.g., HTML documents and XML applications). For example, selection buttons may each have individual attributes such as, for example, text formatting, size, pixel padding, shading, and margin settings. Formatting attributes of text may include, for example, different fonts, font sizes, bold lettering, italicized lettering, single spaces, and subscripts. The formatting attributes of a range of selected objects may be displayed in a variety of manners. For example, if a user selects a range of objects, the font type, font size, line spacing, and whether the font is bolded may be indicated in a combination box near the top of the display. However, if the range of selected objects includes objects having non-uniform formatting attributes, e.g., two different types of fonts, the indication of the formatting attributes is blank.

Thus, it is desirable for a method and system to indicate the formatting attributes of selected ranges of objects having non-uniform formatting attributes. It is further desirable for the system to indicate what portions of the objects in the selected range of objects have particular formatting attributes, and the relative amount of the selected range of objects that has the particular formatting attributes.

Figure 1:
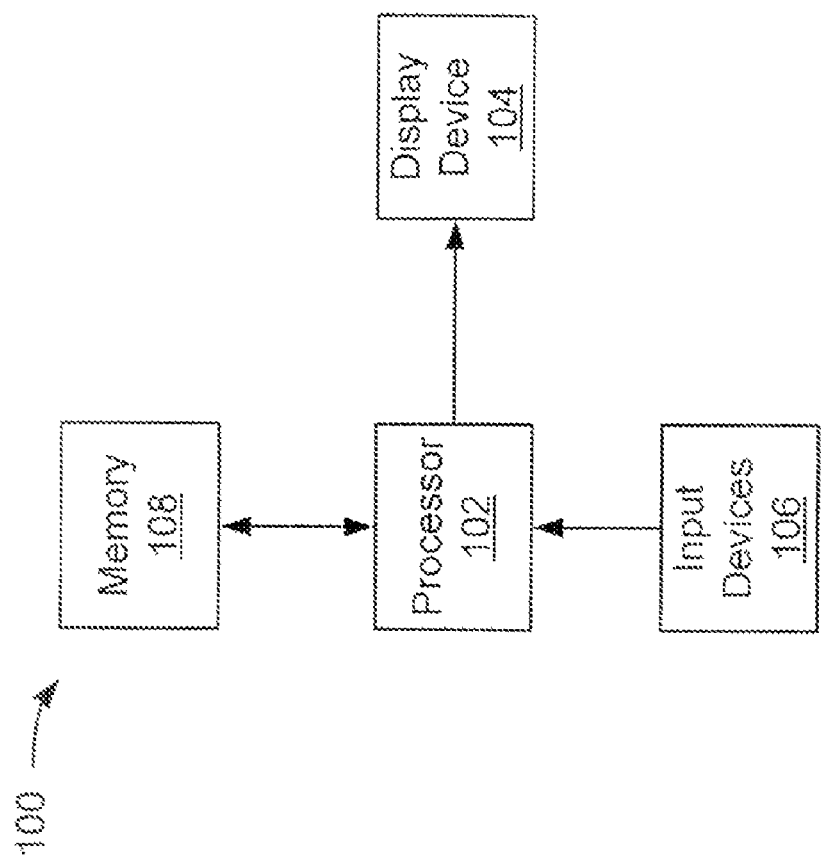
FIG. 1 illustrates an exemplary embodiment of a system involving text attribute recognition.

In this regard, FIG. 1 illustrates an exemplary embodiment of a system for editing objects. The system 100 includes a processor 102 communicatively linked to a display device 104, input devices 106, and a memory 108. In operation, the processor 102 sends and receives data to and from the memory 108 for storage. The processor 102 outputs data for display to the display device 104, and receives inputs from a user via the input devices 106. Input devices 106 may include, for example, a keyboard and a mouse.

Figure 2:
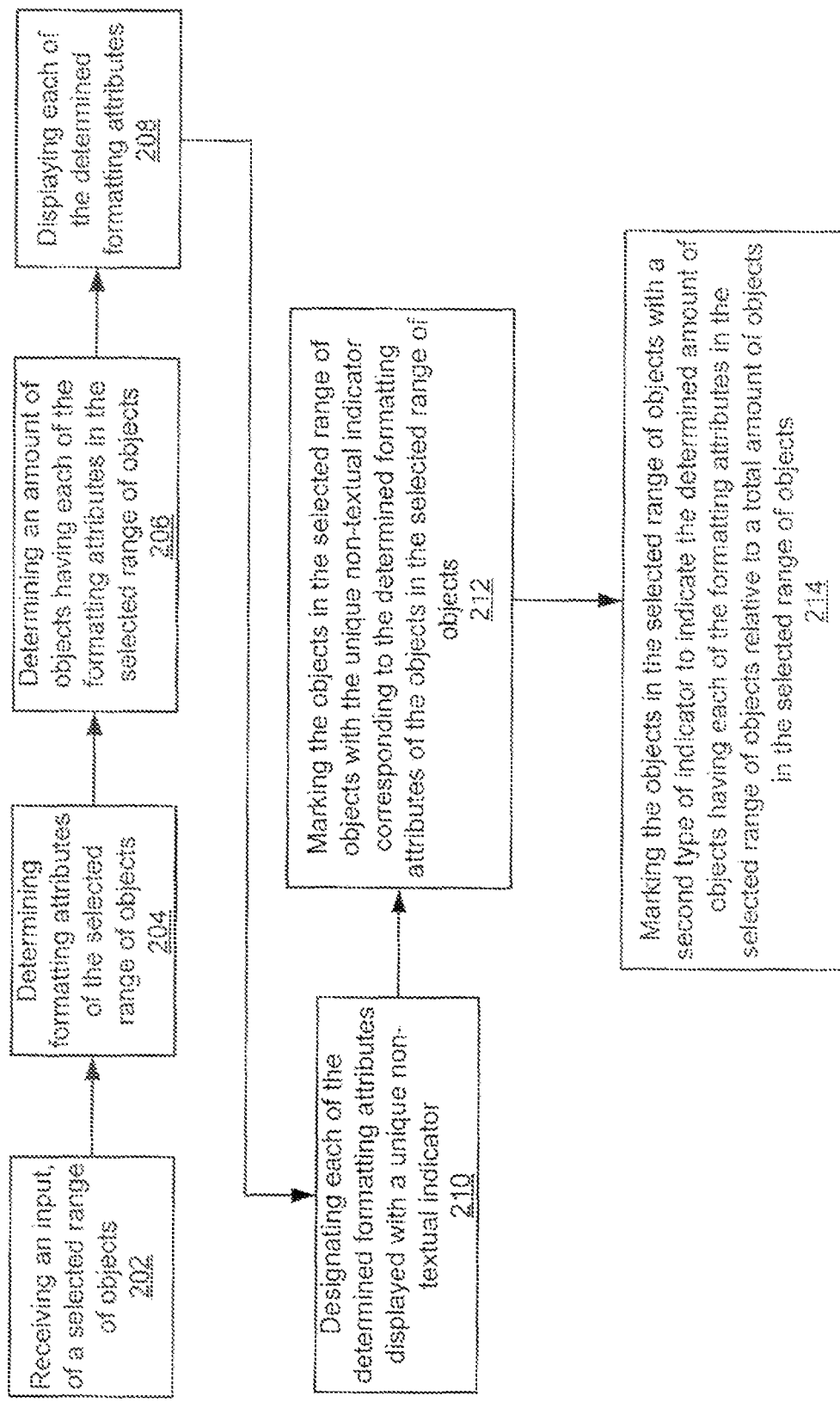
FIG. 2 illustrates an exemplary embodiment of a method involving object attribute recognition.

FIG. 2 illustrates a block diagram of an exemplary embodiment of a method for formatting objects. In block 202, an input of a selected group of objects is received. Formatting attributes of the selected group of objects are determined in block 204. In block, 206 the amount of objects having each of the formatting attributes in the selected range of objects is determined. In block 208 each of the determined formatting attributes are displayed. Each of the determined formatting attributes are displayed with a unique non-textual indicator in block 210. The objects in the selected range of objects are marked with the unique non-textual indicator corresponding to the determined formatting attributes of the objects in the selected range of objects in block 212. In block 214, the objects in the selected range of objects are marked with a second type of indicator to indicate the determined amount of objects having each of the formatting attributes in the selected range of objects relative to a total amount of objects in the selected range of objects.

The indicators may include any non-textual indicator that may designate a selected range of objects as having particular formatting attributes. For example, the indicators may include, but are not limited to, colored highlighting, colored text, patterned highlighting, a variety of shading types, and patterned text. Other non-textual indicators may include animated indicators such as, for example flashing text, flashing highlighting, patterns that change, and colors that change. Icons may also be used that indicate a formatting attribute. The icons may include visual indicators similar to the indicators discussed above.

Figure 3:
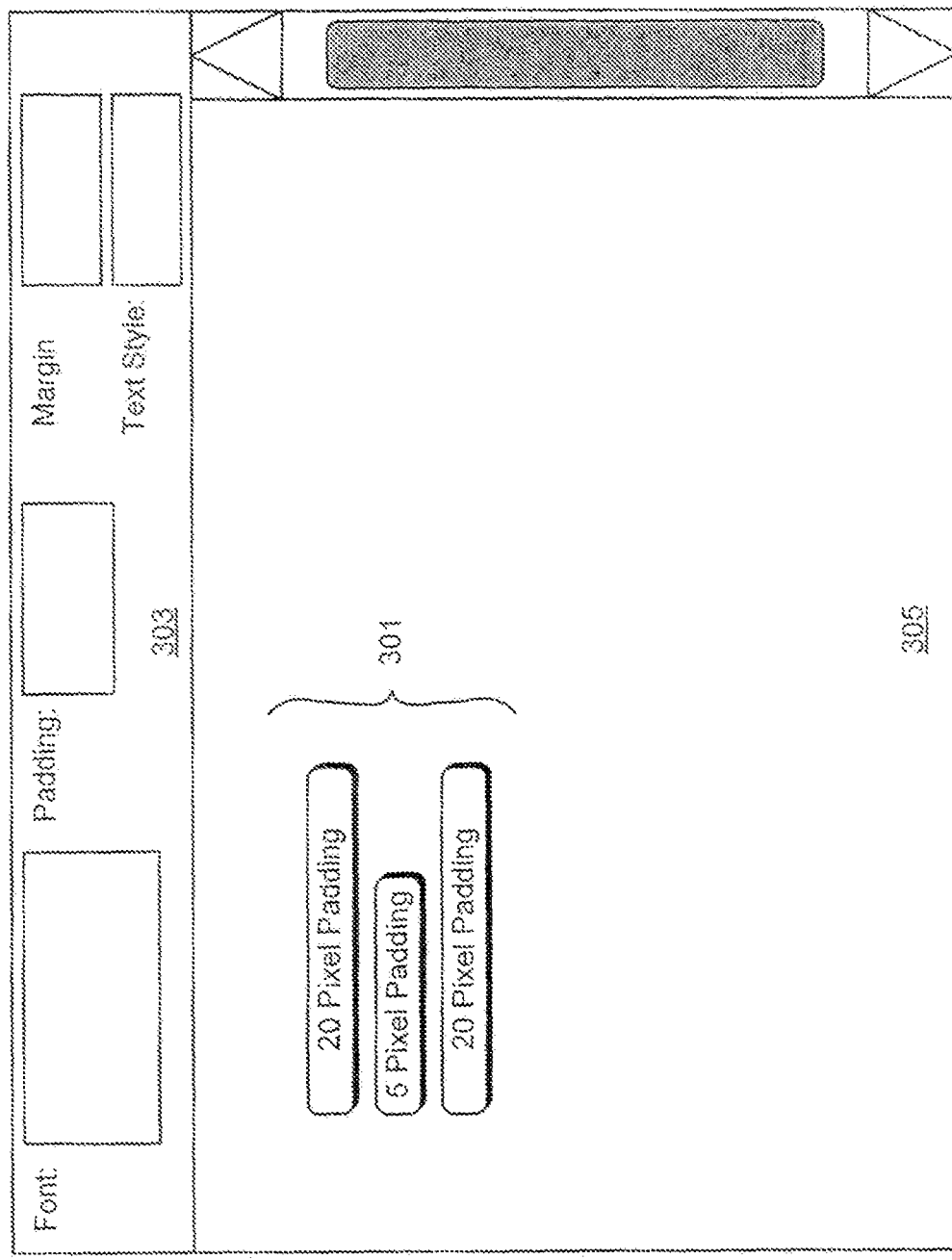
FIGS. 3 and 4 illustrate an exemplary output of the method illustrated in FIG. 2.
Figure 4:
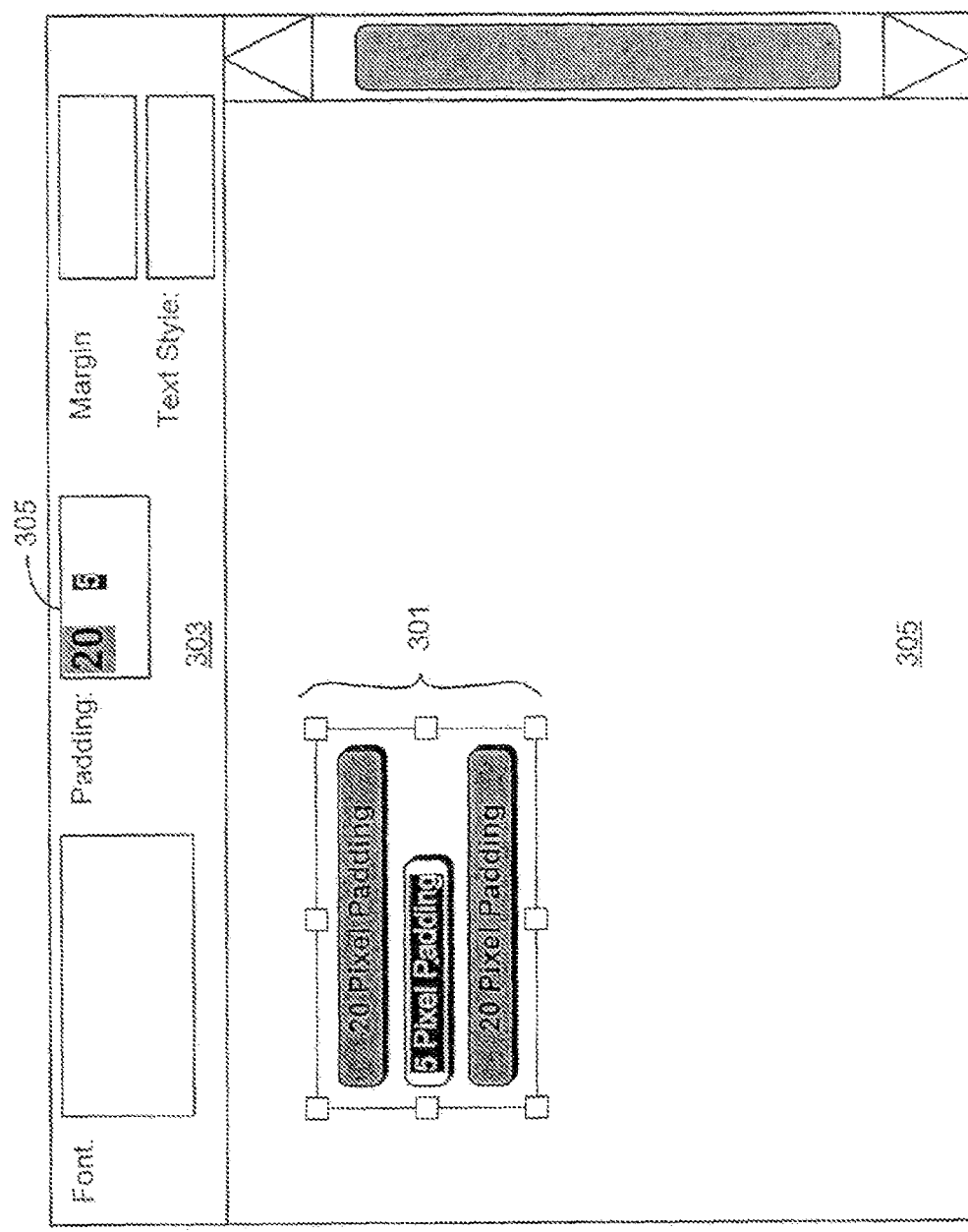

FIGS. 3 and 4 illustrate an exemplary embodiment of a graphical display involving programming selection buttons for software in accordance with the method illustrated in FIG. 2. Referring to FIG. 3, a plurality of selection buttons 301 are displayed in a window 305. The plurality of selection buttons 301 has formatting attributes of "pixel padding." In the illustrated embodiment two of the plurality of selection buttons 301 have "20 Pixel Padding," while one of the plurality of selection buttons 301 has "5 Pixel Padding." The attributes of the buttons may be displayed in the box 303.

Referring now to FIG. 4, the plurality of selection buttons 301 have been selected by a user. The attributes of the buttons are displayed in the box 303. In the illustrated embodiment, both values (the padding value of 20 and the padding value of 5) are displayed in a second box 305. The second box 305 is a combination box. Other methods for indicating formatting attributes may be used that may include displaying formatting attributes in, for example, status bars or in other areas of a display. The number 20 is larger to indicate that the padding value of 20 is more prevalent in the three selected buttons 301 (i.e., The amount of selected objects having a padding value of 20 is greatest relative to the total amount of selected objects.). FIG. 3 illustrates one non-limiting example of the types of objects and attributes that may be selected and displayed in a similar manner to the text examples discussed above.

Additionally, the number 20 and the number 5 in the second box 305 are each shaded to indicate the respective formatting attribute. Each of the plurality of selection buttons 301 are shaded to correspond to the respective formatting attribute shown in the second box 305.

The difference in shading indications in the plurality of selection buttons 301 corresponding to the shading indications for the padding value displayed in the second box 305, allows a user to quickly determine the formatting attributes of selected objects. The use of similar indicators may also be implemented for other formatting attributes such as, for example font size, line spacing, and text style. The illustrated embodiments include combination boxes in the box 303 that are used to indicate the formatting attributes. Other methods for indicating formatting attributes may be used that may include displaying formatting attributes in, for example, status bars or in other areas of a display.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for displaying formatting of objects, the method comprising:
   receiving an input, wherein the input is a selected range of objects;
   determining formatting attributes of the selected range of objects;
   determining an amount of objects having each of the formatting attributes in the selected range of objects;
   displaying each of the determined formatting attributes;
   designating each of the determined formatting attributes displayed with a unique non-textual indicator; and
   marking the objects in the selected range of objects with the unique non-textual indicator corresponding to the determined formatting attributes of the objects in the selected range of objects; and
   marking the objects in the selected range of objects with a second type of indicator to indicate the determined amount of objects having each of the formatting attributes in the selected range of objects relative to a total amount of objects in the selected range of objects.

2. The method of claim 1, wherein the formatting attributes include:
   font types;
   font sizes;
   pixel padding;
   aural cues;
   margin values;
   line spacing; and
   formatting style.

3. The method of claim 1, wherein the non-textual indicators include:
   colors;
   patterns; and
   animation, wherein animation includes:
   changing patterns;
   changing colors; and
   flashing.

4. The method of claim 1, wherein the second type of indicators comprise text sizes of text in the selected range of objects.

* * * * *